(12) United States Patent
Kim

(10) Patent No.: US 9,713,954 B2
(45) Date of Patent: Jul. 25, 2017

(54) ELECTRONIC INDIRECT BY-PASS TYPE SEMI-ACTIVE MOUNT, ELECTRONIC SEMI-ACTIVE MOUNT APPARATUS, AND METHOD OF CONTROLLING DYNAMIC CHARACTERISTIC VARIABLE RATE THEREOF

(71) Applicant: Hyundai Motor Company, Seoul (KR)

(72) Inventor: Seung-Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 38 days.

(21) Appl. No.: 14/555,387

(22) Filed: Nov. 26, 2014

(65) Prior Publication Data

US 2016/0001648 A1    Jan. 7, 2016

(30) Foreign Application Priority Data

Jul. 3, 2014    (KR) .................. 10-2014-0083044

(51) Int. Cl.
*F16F 13/00*    (2006.01)
*B60K 5/12*    (2006.01)
*F16F 13/26*    (2006.01)

(52) U.S. Cl.
CPC .......... *B60K 5/1283* (2013.01); *F16F 13/002* (2013.01); *F16F 13/26* (2013.01)

(58) Field of Classification Search
CPC .......... F16F 13/26; F16F 13/105; F16F 13/10; F16F 13/106; F16F 13/264; F16F 13/08; F16F 13/14; F16F 15/02; F16F 13/108; F16F 9/535; F16F 13/268; F16F 1/387; F16F 15/08; F16F 13/262; F16F 13/101; F16F 2236/12; F16F 2236/123; F16F 3/08; F16F 7/095; F16F 7/112; F16F 9/003; F16F 9/04; F16F 9/067; F16F 9/30; F16F 9/303;

(Continued)

(56) References Cited

U.S. PATENT DOCUMENTS

| | | | | |
|---|---|---|---|---|
| 5,620,168 A * | 4/1997 | Ohtake | ................... | F16F 13/26 267/140.13 |
| 6,585,242 B2 * | 7/2003 | Kodama | ................. | F16F 13/26 267/140.13 |

(Continued)

FOREIGN PATENT DOCUMENTS

| | | |
|---|---|---|
| JP | 06-328948 A | 11/1994 |
| JP | 10-246277 A | 9/1998 |

(Continued)

*Primary Examiner* — Steven Marsh
(74) *Attorney, Agent, or Firm* — Morgan Lewis & Bockius LLP

(57) ABSTRACT

An electronic indirect by-pass type semi-active mount may include a primary diaphragm dividing a lower fluid chamber, where a fluid in an upper fluid chamber to which an exciting force as external force is applied is circulated, into a primary lower fluid chamber where the fluid is circulated, a secondary diaphragm dividing the lower fluid chamber into a secondary lower fluid chamber where the fluid is circulated, a secondary diaphragm bracket blocking an atmospheric pressure formation peripheral space in which atmospheric pressure acts beneath the primary diaphragm and forming an atmospheric pressure formation central space in which atmospheric pressure acts beneath secondary diaphragm, and by-pass channels.

11 Claims, 10 Drawing Sheets

(58) Field of Classification Search
CPC ........ F16F 9/3207; F16F 9/3235; F16F 9/325; F16F 9/348; F16F 9/368
USPC ............... 248/562, 566; 267/140.11, 140.12, 267/140.13, 140.14
See application file for complete search history.

(56) References Cited

U.S. PATENT DOCUMENTS

| | | | |
|---|---|---|---|
| 8,333,368 B2* | 12/2012 | Rooke ................... | F16F 13/102 188/282.6 |
| 2003/0011117 A1* | 1/2003 | Nishi .................... | F16F 13/268 267/140.14 |
| 2003/0098533 A1* | 5/2003 | Nishi .................... | F16F 13/262 267/140.11 |
| 2005/0127586 A1* | 6/2005 | Maeno .................. | F16F 13/264 267/140.13 |
| 2005/0258581 A1* | 11/2005 | Tanaka .................. | F16F 13/262 267/140.11 |
| 2006/0249891 A1* | 11/2006 | Ueki ..................... | F16F 13/105 267/140.13 |

FOREIGN PATENT DOCUMENTS

| | | |
|---|---|---|
| JP | 2003-222184 A | 8/2003 |
| JP | 2009-143380 A | 7/2009 |
| JP | 2009-264499 A | 11/2009 |
| JP | 2010-264925 A | 11/2010 |
| KR | 95-6708 U | 3/1995 |
| KR | 10-2011-0098951 A | 9/2011 |

* cited by examiner

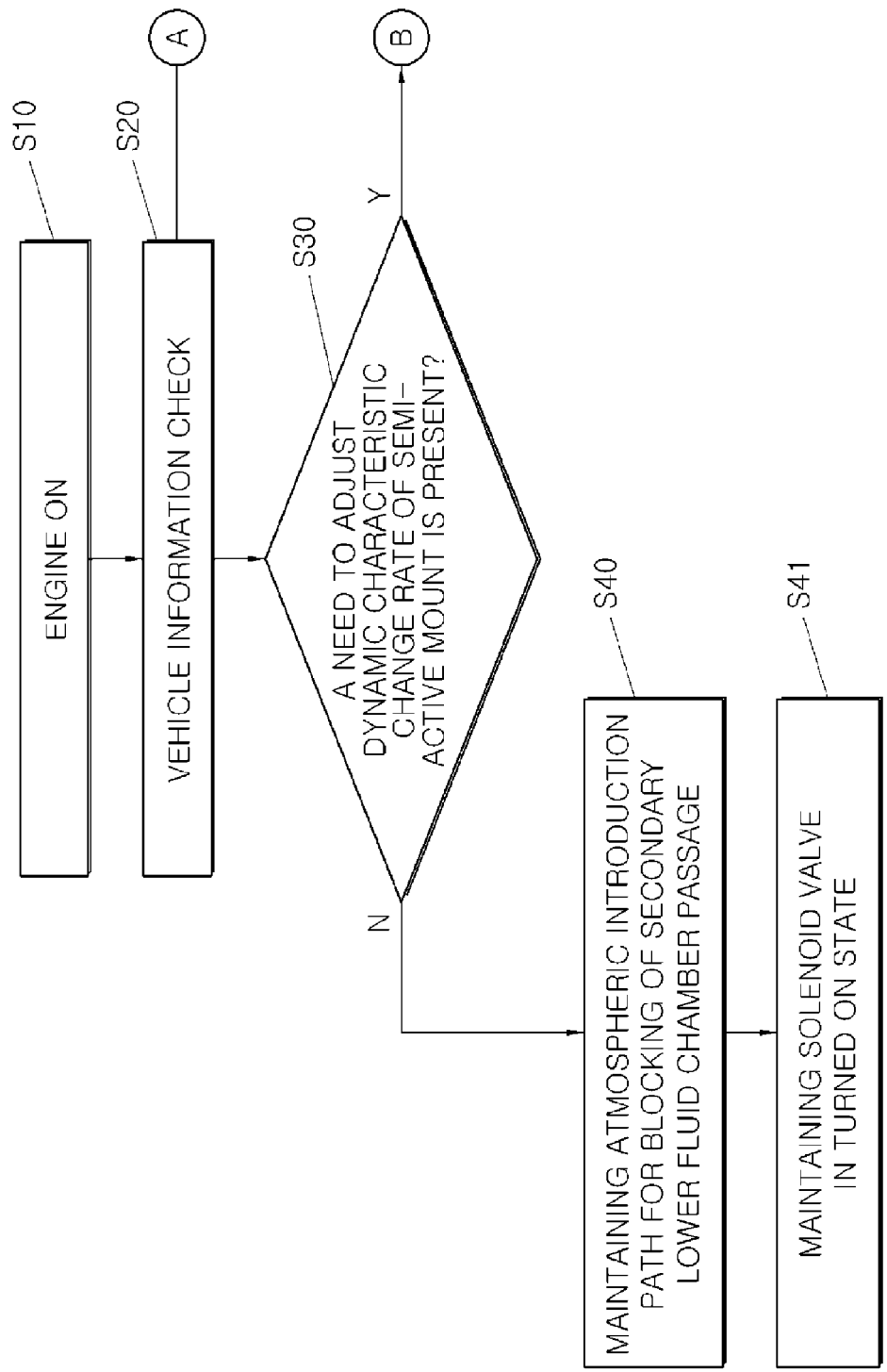

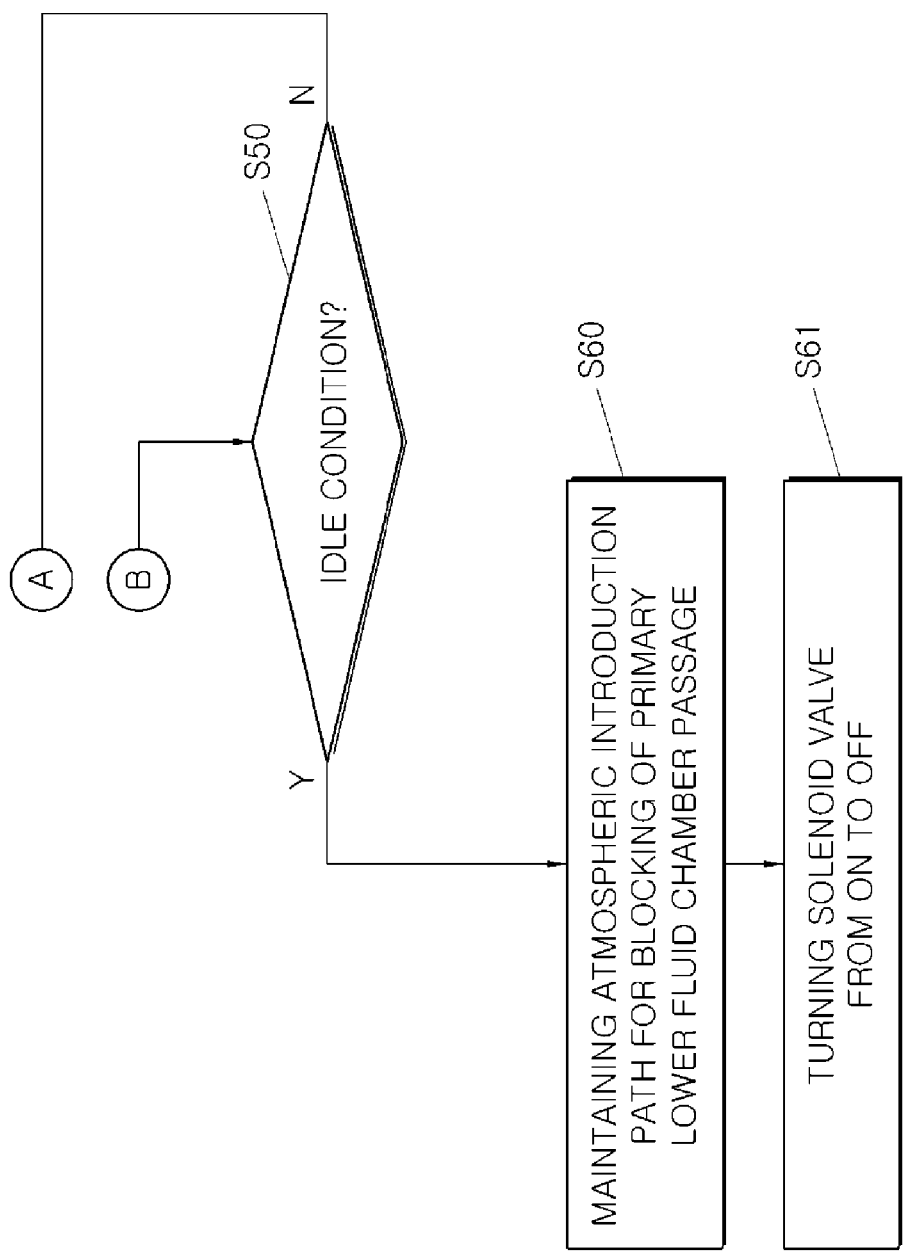

ELECTRONIC INDIRECT BY-PASS TYPE SEMI-ACTIVE MOUNT, ELECTRONIC SEMI-ACTIVE MOUNT APPARATUS, AND METHOD OF CONTROLLING DYNAMIC CHARACTERISTIC VARIABLE RATE THEREOF

CROSS-REFERENCE TO RELATED APPLICATIONS

The present application claims priority to Korean Patent Application No. 10-2014-0083044, filed Jul. 3, 2014, the entire contents of which is incorporated herein for all purposes by this reference.

BACKGROUND OF THE INVENTION

Field of the Invention

Various embodiments of the present invention relate to an electronic semi-active mount, and, particularly, to an electronic indirect by-pass type semi-active mount realized in an indirect by-pass manner capable of increasing a dynamic characteristic change rate and to which a solenoid valve generating a small force compared to a vacuum negative pressure is applied, an electronic semi-active mount apparatus, and a method of controlling a dynamic characteristic variable rate thereof.

Description of Related Art

In general, a semi-active mount provided between an engine (or a power train) and a vehicle body effectively reduces vibration caused due to driving of the engine by ON/OFF controlling dynamic characteristics.

The semi-active mount (hereinafter, referred to as "SAC") is classified into a vacuum negative pressure type SAC which controls an inner passage in a by-pass manner and an electronic SAC which controls an inner passage in a VS (Volume-Stiffness) manner by a solenoid valve. Considering performance, the vacuum negative pressure type SAC has an advantage of having good low frequency dynamic characteristics because of having a dynamic ratio of about 0.6 in a low frequency range (20~40 Hz), compared to the electronic SAC having good high frequency dynamic characteristics. Accordingly, since the vacuum negative pressure type SAC is very advantageous to maximize idle performance of the engine, it is mainly applied to vehicles.

On the other hand, the vacuum negative pressure type SAC is supplied with a vacuum negative pressure from an intake manifold (or a gasoline engine) a vacuum tank (a diesel). For this reason, the vacuum negative pressure type SAC may cause disadvantages such as addition of parts by a vacuum hose, modification of parts due to application of a valve for vacuum negative pressure to the engine, and layout change of an engine room, and a combustion back pressure may be lost in the vacuum negative pressure type SAC.

To resolve problems of the vacuum negative pressure type SAC, there is used an electronic indirect by-pass type SAC (hereinafter, referred to as "EIBP_SAC") which is an electronic SAC and indirectly realizes a BP (By-Pass) manner in a VS (Volume-Stiffness) manner.

The EIBP_SAC is provided with a secondary nozzle and a secondary diaphragm using the VS manner. A solenoid valve generating a small force compared to a vacuum negative pressure is opened or closed such that air outside the secondary diaphragm communicates or does not communicate with the atmosphere, thereby enabling a fluid flowing to the secondary nozzle to be controlled in the BP manner of the vacuum negative pressure type SAC.

Therefore, the EIBP_SAC may resolve problems in relation to an overall size, heating, and an amount of current due to opening or closing of the secondary nozzle using the solenoid valve by introducing the BP manner to the vacuum negative pressure type SAC. Particularly, since the EIBP_SAC uses electromagnetic force generated by the vehicle, the EIBP_SAC may realize simplification of a system and be applied to a different vehicle type, compared to the vacuum negative pressure type SAC.

However, the EIBP_SAC has a structure that the secondary diaphragm through which the outside air communicates or does not communicate with the atmosphere by the solenoid valve is not directly fixed and a primary diaphragm always communicates with the atmosphere. For this reason, when a fluid flowing to the secondary nozzle is controlled, the fluid simultaneously flows to a primary passage. Accordingly, since the EIBP_SAC has a low dynamic characteristic change rate due to the undesired flow of fluid in the primary passage, the EIBP_SAC may be more advantageous to maximize idle performance of the engine, compared to the vacuum negative pressure type SAC.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an electronic indirect by-pass type semi-active mount capable of preventing a fluid from flowing to a passage making a dynamic characteristic change rate low such that a diaphragm suitable for a vehicle driving condition and an idle condition is fixed by controlling atmospheric introduction in two directions in an indirect by-pass manner by one solenoid valve, an electronic semi-active mount apparatus, and a method of controlling a dynamic characteristic variable rate thereof.

According to various aspects of the present invention, an electronic indirect by-pass type semi-active mount may include a primary diaphragm dividing a lower fluid chamber where a fluid in an upper fluid chamber to which an exciting force as external force is applied is circulated into a primary lower fluid chamber where the fluid is circulated, a secondary diaphragm dividing the lower fluid chamber into a secondary lower fluid chamber where the fluid is circulated, a secondary diaphragm bracket blocking an atmospheric pressure formation peripheral space in which atmospheric pressure acts beneath the primary diaphragm and forming an atmospheric pressure formation central space in which atmospheric pressure acts beneath secondary diaphragm, and by-pass channels in which a solenoid valve supplied with a current allows the atmospheric pressure formation peripheral space to communicate with an atmosphere whereas the solenoid valve blocks the atmospheric pressure formation central space from the atmosphere, and the solenoid valve which is not supplied with the current blocks the atmospheric pressure formation peripheral space from the atmosphere whereas the solenoid valve allows the atmospheric pressure formation central space to communicate with the atmosphere.

The by-pass channels may include an atmospheric pressure channel opened to the atmosphere, a primary diaphragm channel connected to the atmospheric pressure channel to be opened to the atmospheric pressure formation peripheral space, and a secondary diaphragm channel branched from the primary diaphragm channel to be opened to the atmospheric pressure formation central space, and a gate located at a branch part of the primary diaphragm channel and the secondary diaphragm channel may be moved in a reversed direction by the solenoid valve such that the atmospheric pressure formation peripheral space or the atmospheric pressure formation central space is under atmospheric pressure.

The atmospheric pressure channel may be perpendicular to the primary diaphragm channel, and the primary diaphragm channel may be perpendicular to the secondary diaphragm channel.

The secondary diaphragm channel may be further formed with a side expansion channel in a direction in which the atmosphere is introduced through the atmospheric pressure channel, and the side expansion channel may have a length equal to an upward stroke of the gate.

The atmospheric pressure formation peripheral space may be under the atmospheric pressure when the gate is moved upward, whereas the atmospheric pressure formation central space may be under the atmospheric pressure when the gate is moved downward.

The primary diaphragm may be formed integrally with the secondary diaphragm.

An upper core to which the exciting force as the external force is applied may be coupled above the upper fluid chamber, a lower core fixing a passage block formed with the by-pass channels may be coupled beneath the lower fluid chamber, and a bottom of the secondary diaphragm bracket may be supported by the passage block.

The upper fluid chamber may be distinguished from the lower fluid chamber by a first nozzle bracket forming a primary nozzle communicating with the primary lower fluid chamber and a second nozzle bracket forming a secondary nozzle fitted into a central hole of the first nozzle bracket.

The first nozzle bracket may have a dished cross-section, the secondary diaphragm may be located on a flat bottom surface of the first nozzle bracket to form the secondary lower fluid chamber, and the primary diaphragm may be fitted into a groove formed at a recessed circumference of the first nozzle bracket.

The second nozzle bracket may have a hollow boss protruding from a center thereof to form the secondary nozzle, and a plurality of orifice holes through which a fluid passes may be radially formed around the hollow boss.

The upper and lower cores may be coupled by a mounting housing having a plurality of mounting fastening holes.

According to various aspects of the present invention, an electronic semi-active mount apparatus includes an electronic indirect by-pass type semi-active mount configured of an upper fluid chamber receiving a fluid to which an exciting force as external force is transferred as a pressure, a lower fluid chamber in which the fluid in the upper fluid chamber is circulated, a primary diaphragm dividing the lower fluid chamber into a primary lower fluid chamber in which the fluid in the upper fluid chamber is circulated, a secondary diaphragm dividing the lower fluid chamber into a secondary lower fluid chamber in which the fluid in the upper fluid chamber is circulated, a primary nozzle allowing the fluid in the upper fluid chamber to be circulated in the primary lower fluid chamber, a secondary nozzle allowing the fluid in the upper fluid chamber to be circulated in the secondary lower fluid chamber, an upper core to which the exciting force as external force is applied, the upper core being formed above the upper fluid chamber, a lower core formed beneath the lower fluid chamber and fixing a passage block formed with the by-pass channels, a mounting housing coupling the upper and lower cores, and by-pass channels which reverse fixed states of the primary and secondary diaphragms by atmospheric pressure defined when the solenoid valve is turned ON/OFF so as to block the flow of fluid in the primary lower fluid chamber or the secondary lower fluid chamber, and a valve controller to which vehicle driving condition information is input as valve ON data so as to output a valve ON signal for maintaining a current supply of the solenoid valve, and to which idle condition information is input as valve OFF data so as to output a valve OFF signal for interrupting the current of the solenoid valve.

The vehicle driving condition information may be data detected and measured from a vehicle so as to determine that the vehicle is in a driving state, and the idle condition information may be data detected and measured from the vehicle so as to determine idle of an engine.

The valve controller may be an ECU (Engine Control Unit).

According to various aspects of the present invention, a method of controlling a dynamic characteristic variable rate of an electronic semi-active mount may include preparing a dynamic characteristic change rate adjustment of checking vehicle information detected and measured from an engine driving state by a valve controller, and determining, when the vehicle information is checked by the valve controller, a need to adjust a dynamic characteristic change rate of a semi-active mount apparatus including a primary diaphragm forming a primary lower fluid chamber communicating with a primary nozzle such that a fluid in an upper fluid chamber is circulated and a secondary diaphragm forming a secondary lower fluid chamber communicating with a secondary nozzle such that the fluid is circulated, controlling a driving condition in which, when a vehicle driving condition is established when the need to adjust a dynamic characteristic change rate is determined, current supply of a solenoid valve is maintained by the valve controller and a gate connected to the solenoid valve maintains a primary diaphragm channel in a connected state with an atmospheric pressure channel so that an atmospheric pressure formation peripheral space beneath the primary diaphragm is maintained under atmospheric pressure, identifying a dynamic characteristic change rate adjustment, when the vehicle driving condition is not established when the need to adjust a dynamic characteristic change rate is determined, determining a need to adjust a dynamic characteristic change rate to determine an idle condition, and performing a dynamic characteristic change rate adjustment in which, when the idle condition is established, the current supply of the solenoid valve is interrupted by the valve controller and the gate connected to the solenoid valve changes a secondary diaphragm channel to a connected state with the atmospheric pressure channel so that an atmospheric pressure formation central space beneath the secondary diaphragm is under atmospheric pressure.

In the identifying a dynamic characteristic change rate adjustment, the idle condition may include an engine RPM or a vehicle speed.

The current supply and interruption may be performed by the solenoid valve being turned ON/OFF, and the valve controller may be an ECU (Engine Control Unit).

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B are a flowchart illustrating a method of controlling a dynamic characteristic variable rate of the exemplary electronic indirect by-pass type semi-active mount according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
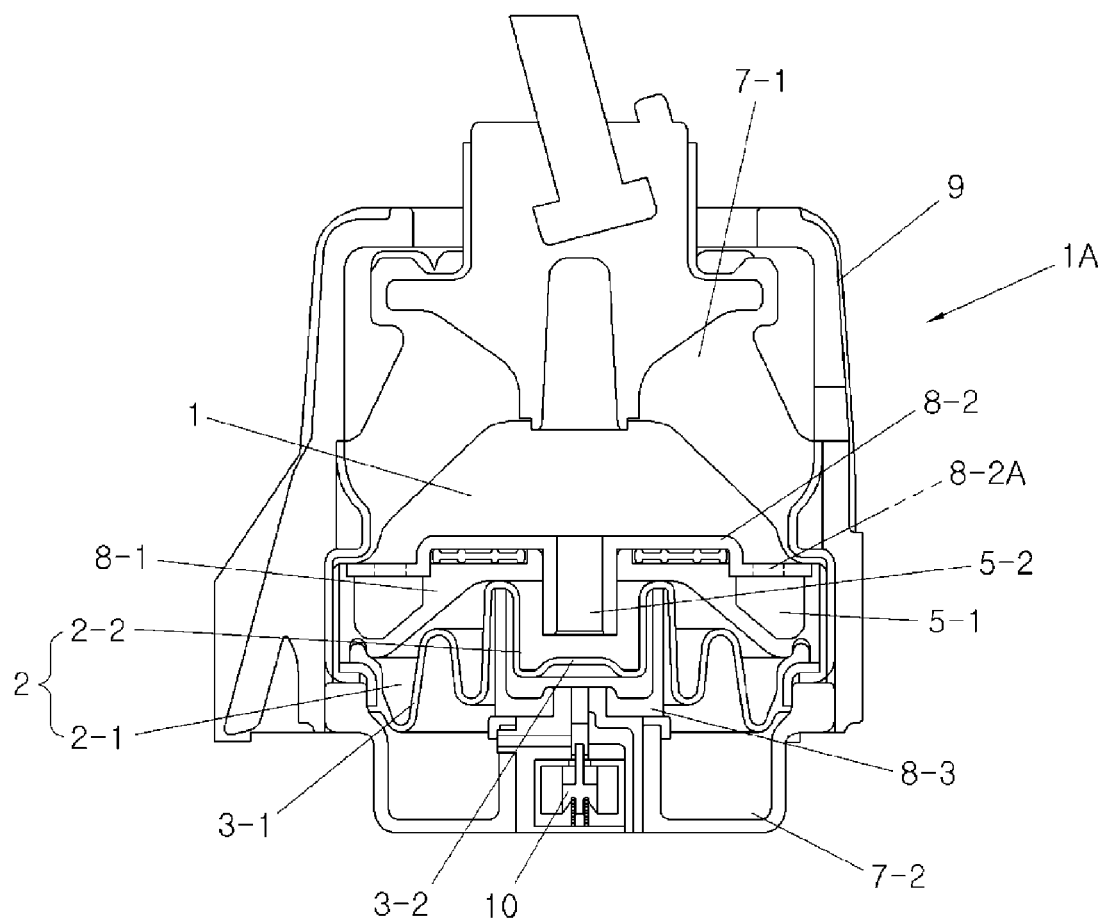
FIG. 1 is a view illustrating a configuration of an exemplary electronic indirect by-pass type semi-active mount according to the present invention.

FIG. 1 is a view illustrating a configuration of an electronic indirect by-pass type semi-active mount according to various embodiments of the present invention.

As shown in FIG. 1, an electronic indirect by-pass type semi-active mount (hereinafter, referred to as "EIBP_SAC) 1A includes an upper fluid chamber 1, a lower fluid chamber 2 divided into primary and secondary lower fluid chambers 2-1 and 2-2, primary and secondary diaphragms 3-1 and 3-2, primary and secondary nozzles 5-1 and 5-2, first and second nozzle brackets 8-1 and 8-2, a secondary diaphragm bracket 8-3, and a by-pass switch 10.

The upper fluid chamber 1 receives a fluid to which an exciting force as external force is transferred as a pressure. The fluid is circulated through each of the primary and secondary lower fluid chambers 2-1 and 2-2, and low frequency dynamic characteristics in a low frequency range (20~40 Hz) is improved by controlling the flow of fluid by the by-pass switch 10.

The primary diaphragm 3-1 distinguishes the primary lower fluid chamber 2-1 from the secondary lower fluid chamber 2-2, and the secondary diaphragm 3-2 distinguishes the secondary lower fluid chamber 2-2 from the primary lower fluid chamber 2-1. Particularly, the primary diaphragm 3-1 is formed in a jabara shape having the secondary diaphragm 3-2 protruding from a center thereof, thereby allowing the primary and secondary diaphragms 3-1 and 3-2 to be formed integrally with each other. In various embodiments, a region formed under atmospheric pressure beneath the primary diaphragm 3-1 is referred to as an atmospheric pressure formation peripheral space, and a region formed under atmospheric pressure beneath the secondary diaphragm 3-2 is referred to as an atmospheric pressure formation central space.

The primary nozzle 5-1 may communicate with the primary lower fluid chamber 2-1 such that a fluid is circulated through the upper fluid chamber 1 and the primary lower fluid chamber 2-1, and the secondary nozzle 5-2 may communicate with the secondary lower fluid chamber 2-2 such that a fluid is circulated through the upper fluid chamber 1 and the secondary lower fluid chamber 2-2.

The first nozzle bracket 8-1 forms the primary and secondary lower fluid chambers 2-1 and 2-2 by fitting the primary diaphragm 3-1 into a recessed groove of the first nozzle bracket 8-1. Particularly, the first nozzle bracket 8-1 has a dished cross-section such that the secondary diaphragm 3-2 is located on a flat bottom surface thereof. Consequently, the secondary lower fluid chamber 2-2 is formed and the primary diaphragm 3-1 is located at the recessed circumference of the first nozzle bracket 8-1.

The second nozzle bracket 8-2 is coupled to the first nozzle bracket 8-1 to distinguish the upper fluid chamber 1 from the lower fluid chamber 2. To this end, the second nozzle bracket 8-2 has a hollow boss protruding from a center thereof to be inserted into a central hole of the first nozzle bracket 8-1, and a plurality of orifice holes 8-2A for passage of a fluid is radially formed around the hollow boss. Therefore, the primary nozzle 5-1 is formed by an empty space defined in the primary lower fluid chamber 2-1 by overlapping of the second and first nozzle brackets 8-2 and 8-1, and the secondary nozzle 5-2 is formed by the hollow boss of the second nozzle bracket 8-2.

The secondary diaphragm bracket 8-3 surrounds the secondary diaphragm 3-2 from downward of the secondary diaphragm 3-2 in a supported state by the by-pass switch 10.

Consequently, even when the primary diaphragm 3-1 is simply fitted to the first nozzle bracket 8-1, the primary and secondary diaphragms 3-1 and 3-2 are fixedly formed. Particularly, the secondary diaphragm bracket 8-3 presses the secondary diaphragm 3-2 against the bottom surface of the first nozzle bracket 8-1 by positional movement of the secondary diaphragm bracket 8-3 when the by-pass switch 10 is turned ON/OFF, so that the primary lower fluid chamber 2-1 is perfectly isolated from the secondary lower fluid chamber 2-2.

When the by-pass switch 10 is turned ON/OFF, the by-pass switch 10 changes atmospheric pressure acting on the primary diaphragm 3-1 toward the secondary diaphragm bracket 8-3 such that the primary lower fluid chamber 2-1 is perfectly isolated from the secondary lower fluid chamber 2-2, thereby controlling the flow of fluid flowing to the primary and secondary nozzles 5-1 and 5-2.

In addition, the EIBP_SAC (1A) further includes an upper core 7-1, a lower core 7-2, and a mounting housing 9.

The upper core 7-1 is made of an elastic material and is located above the second nozzle bracket 8-2 to form the upper fluid chamber 1. Therefore, the upper core 7-1 is deformed by an exciting force as external force to deform the upper fluid chamber 1, and a pressure by deformation of the upper fluid chamber 1 is transferred to a fluid filled in the upper fluid chamber 1 to form the flow of fluid flowing to the primary and secondary nozzles 5-1 and 5-2.

The lower core 7-2 is coupled to a lower portion of the upper core 7-1 to form an inner space, and the inner space is provided with the lower fluid chamber 2 divided into the primary and secondary lower fluid chambers 2-1 and 2-2, the primary and secondary diaphragms 3-1 and 3-2, the primary and secondary nozzles 5-1 and 5-2, the first and second nozzle brackets 8-1 and 8-2, the secondary diaphragm bracket 8-3, and the by-pass switch 10. Particularly, the lower core 7-2 is formed with a by-pass switch receiving portion into which the by-pass switch 10 is fitted and inserted to be coupled to the lower core 7-2.

The mounting housing 9 is formed with a plurality of mounting holes for fastening with other parts so that the upper core 7-1 is integral with the lower core 7-2.

Figure 2:
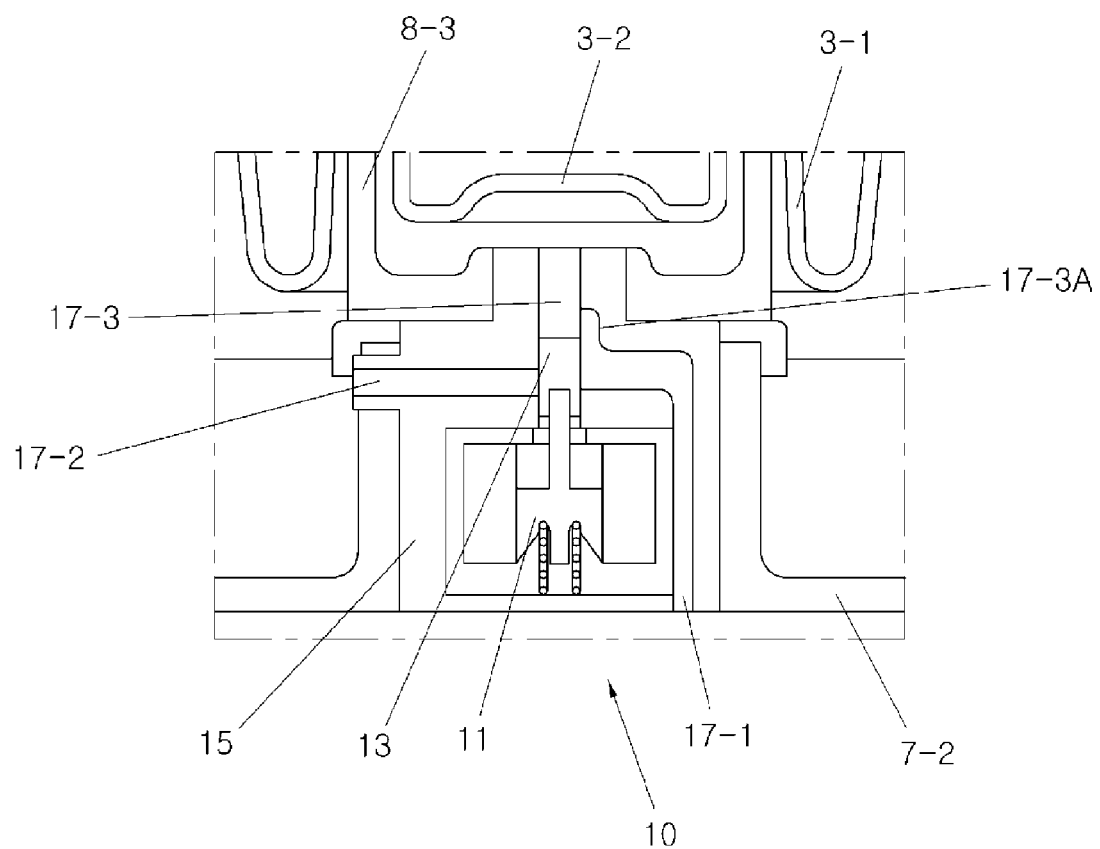
FIG. 2 is a view illustrating a configuration of a passage controller of the exemplary electronic indirect by-pass type semi-active mount according to the present invention.

Meanwhile, FIG. 2 shows a detailed configuration of the by-pass switch 10. As shown in the drawing, the by-pass switch 10 includes a solenoid valve 11, a gate 13, a passage block 15, and by-pass channels which change an atmospheric pressure formation direction.

The solenoid valve 11 is an electronic valve which is operated and stopped by ON/OFF, and includes a coil supplied with power, an electromagnet magnetized during power supply, a plunger which is fully withdrawn by magnetic force when the solenoid valve 11 is turned ON, and a return spring for returning an initial position of the plunger.

The gate 13 moves together with the plunger of the solenoid valve 11 so that a position of the gate 13 is moved together with the plunger when the solenoid valve 11 is turned from ON to OFF. The position movement of the gate 13 changes an atmospheric pressure formation direction in the by-pass channels.

The passage block 15 has the solenoid valve 11 therein and the by-pass channels which change an atmospheric pressure formation direction to the gate 13, and is fitted and inserted into the by-pass switch receiving portion of the lower core 7-2.

The by-pass channels are configured of an atmospheric pressure channel 17-1, a primary diaphragm channel 17-2, and a secondary diaphragm channel 17-3. When viewed from a cross-section of the passage block 15, the atmospheric pressure channel 17-1 forms a vertical line, the primary diaphragm channel 17-2 forms a horizontal line, and the secondary diaphragm channel 17-3 forms a vertical line. The atmospheric pressure channel 17-1, the primary diaphragm channel 17-2, and the secondary diaphragm channel 17-3 communicate with each other. The gate 13 is located at a branch part of the primary diaphragm channel 17-2 and the secondary diaphragm channel 17-3.

The atmospheric pressure channel 17-1 is constantly exposed to the atmosphere to form atmospheric pressure. The primary diaphragm channel 17-2 is connected to the atmospheric pressure channel 17-1 so as to allow a space defined by the lower core 7-2 and the primary diaphragm 3-1 when the gate 13 is moved upward to be under atmospheric pressure. Therefore, when the primary diaphragm channel 17-2 is opened, the secondary diaphragm 3-2 on which atmospheric pressure does not act is fixed unlike the primary diaphragm 3-1 on which atmospheric pressure acts, thereby closing the secondary nozzle 5-2 so as not to form the flow of fluid through the secondary lower fluid chamber 2-2. The secondary diaphragm channel 17-3 is connected to the primary diaphragm channel 17-2 so as to allow a space defined by the secondary diaphragm bracket 8-3 and the secondary diaphragm 3-2 when the gate 13 is moved downward to be under atmospheric pressure. Therefore, when the secondary diaphragm channel 17-3 is opened, the primary diaphragm 3-1 on which atmospheric pressure does not act is fixed unlike the secondary diaphragm 3-2 on which atmospheric pressure acts, thereby closing the primary nozzle 5-1 so as not to form the flow of fluid through the primary lower fluid chamber 2-1.

Particularly, the secondary diaphragm channel 17-3 is further formed with a side expansion channel 17-3A in a direction in which the atmosphere is introduced through the atmospheric pressure channel 17-1 so as to have a more expanded cross-section size. A formation length of the side expansion channel 17-3A is equal to an upward stroke of the gate 13 which is fully moved upward toward the secondary diaphragm channel 17-3. Therefore, when the side expansion channel 17-3A is blocked by the gate 13, the atmospheric pressure formation by the secondary diaphragm channel 17-3 is also blocked.

Figure 3:
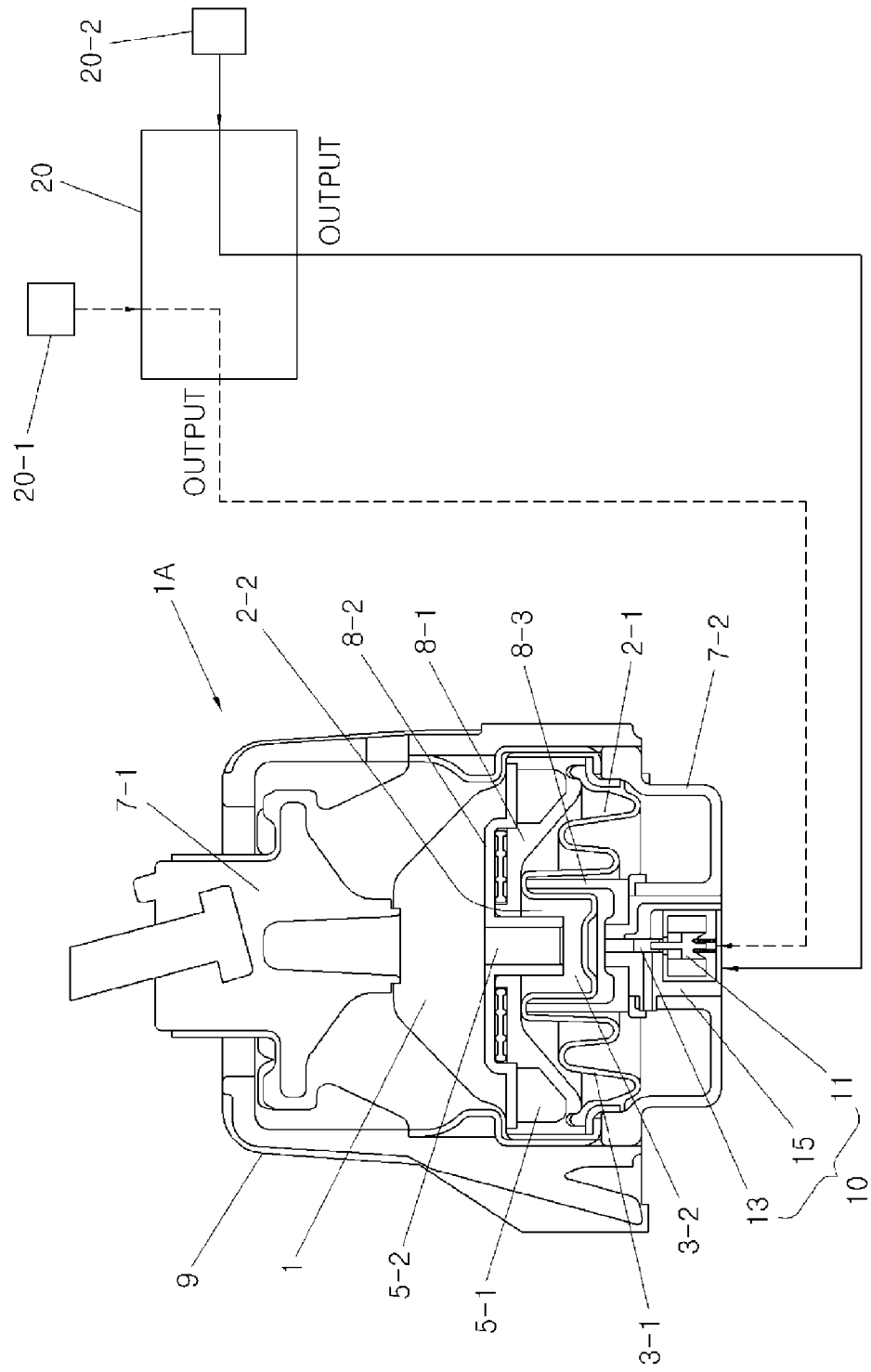
FIG. 3 a view illustrating a configuration of an electronic semi-active mount apparatus in the exemplary electronic indirect by-pass type semi-active mount according to the present invention.

Meanwhile, FIG. 3 a view illustrating a configuration of an electronic semi-active mount apparatus according to various embodiments of the present invention.

As shown in the drawing, the electronic semi-active mount apparatus includes an EIBP_SAC 1A and a valve controller 20 which controls a change of direction of two passages in an indirect by-pass manner so as not to decrease a dynamic characteristic change rate of the EIBP_SAC 1A.

As described through FIG. 1, the EIBP_SAC 1A includes the upper fluid chamber 1, the primary and secondary lower fluid chambers 2-1 and 2-2, the primary and secondary diaphragms 3-1 and 3-2, the primary and secondary nozzles 5-1 and 5-2, the first and second nozzle brackets 8-1 and 8-2, the secondary diaphragm bracket 8-3, the upper and lower cores 7-1 and 7-2, the mounting housing 9, and the by-pass switch 10. As described through FIG. 2, the by-pass switch 10 includes the solenoid valve 11, the gate 13, the passage block 15, the atmospheric pressure channel 17-1, the primary diaphragm channel 17-2, the secondary diaphragm channel 17-3, and the side expansion channel 17-3A. Therefore, the EIBP_SAC 1A described through FIG. 1 and FIG. 2 is applied to the semi-active mount apparatus.

The valve controller 20 includes valve ON data 20-1 from which a power supply output signal for maintaining the valve in a turned ON state is generated and valve OFF data 20-2 from which a power disconnection output signal for maintaining the valve in a turned OFF state is generated. The valve ON data 20-1 is a vehicle driving condition required to determine that the vehicle is in a driving state, and includes all data detected when the vehicle is driven if necessary. The vehicle driving condition includes a vehicle speed, a steering angle, a throttle opening angle, an accelerator pedal stroke, etc. The valve OFF data 20-2 is an idle condition required to determine idle of the engine.

Therefore, the valve controller 20 is preferably an ECU (Engine Control Unit or Electronic Control Unit).

Figure 4:
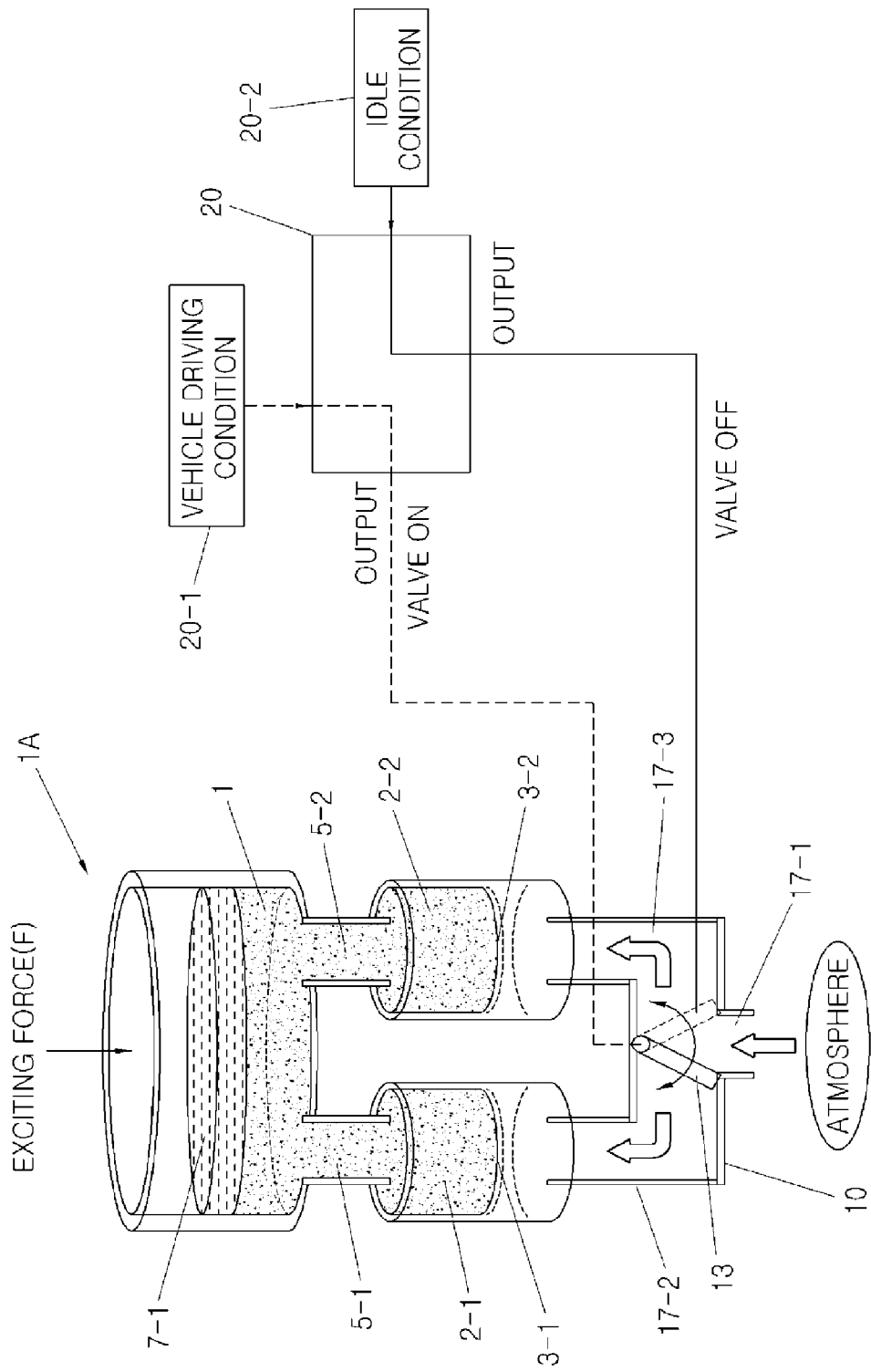
FIG. 4 is a diagram illustrating an operation state of the electronic semi-active mount apparatus in the exemplary electronic indirect by-pass type semi-active mount according to the present invention.

Meanwhile, FIG. 4 shows an example in which the valve controller 20 controls the EIBP_SAC 1A using the vehicle driving condition and the idle conditions.

For example, when the vehicle driving condition is input to the valve controller 20 as the valve ON data 20-1, the valve controller 20 generates output for turning the valve ON and the output for turning the valve ON maintains current supply of the solenoid valve 11 such that the secondary diaphragm channel 17-3 is maintained in a blocked state by the gate 13 (a state indicated by a broken line in FIG. 4). In this state, the atmospheric pressure channel 17-1 communicates with the primary diaphragm channel 17-2 so that a state, in which the atmospheric pressure acts on the primary diaphragm 3-1 whereas the atmospheric pressure does not act on the secondary diaphragm 3-2, is maintained.

However, when the idle condition is input to the valve controller 20 as the valve OFF data 20-2, the valve controller 20 generates output for turning the valve OFF and the output for turning the valve OFF blocks current supply of the solenoid valve 11 such that the gate 13 blocks the primary diaphragm channel 17-2 whereas it opens the secondary diaphragm channel 17-3 (a state indicated by a solid line in FIG. 4). Consequently, the atmospheric pressure channel 17-1, the secondary diaphragm channel 17-3, and the side expansion channel 17-3A communicate with each other so that a state, in which the atmospheric pressure acts on the secondary diaphragm 3-2 whereas the atmospheric pressure does not act on the primary diaphragm 3-1, is maintained.

Therefore, in the semi-active mount apparatus, the valve controller 20 may control the change of direction of two passages in the indirect by-pass manner by only turning the valve ON or OFF. Consequently, the EIBP_SAC 1A may be controlled without decreasing the dynamic characteristic change rate thereof.

Meanwhile, FIG. 5A and FIG. 5B are a flowchart illustrating a method of controlling the dynamic characteristic variable rate of the EIBP_SAC 1A by the valve controller 20 according to the present embodiment. FIG. 6A, FIG. 6B, FIG. 7, FIG. 8A, FIG. 8B and FIG. 9 are respectively diagrams illustrating an operation state of the EIBP_SAC 1A by the valve controller 20.

The valve controller 20 described below may be an ECU (Engine Control Unit or Electronic Control Unit).

S10 is a step of identifying that the engine is turned ON, and is performed by the valve controller 20 identifying that a key is turned ON. S20 is a step of performing a vehicle information check, and is performed by the valve controller 20 reading all data detected when the vehicle is driven or reading a vehicle speed, a steering angle, a throttle opening angle, an accelerator pedal stroke, etc. used to determine the vehicle driving condition.

S30 is a step of determining a need to adjust the dynamic characteristic change rate of the EIBP_SAC 1A, and is performed by determining the vehicle driving condition from all data including a vehicle speed, a steering angle, a throttle opening angle, an accelerator pedal stroke, etc. read by the valve controller 20.

When it is determined that the vehicle driving condition is established at S30, the valve controller 20 maintains a current state as it is without determining a need to adjust the dynamic characteristic change rate. Therefore, in the vehicle driving condition, an atmospheric introduction path is maintained for blocking of a secondary lower fluid chamber passage such as at S40 and the solenoid valve is maintained in a turned ON state such as S41.

Figure 6A:
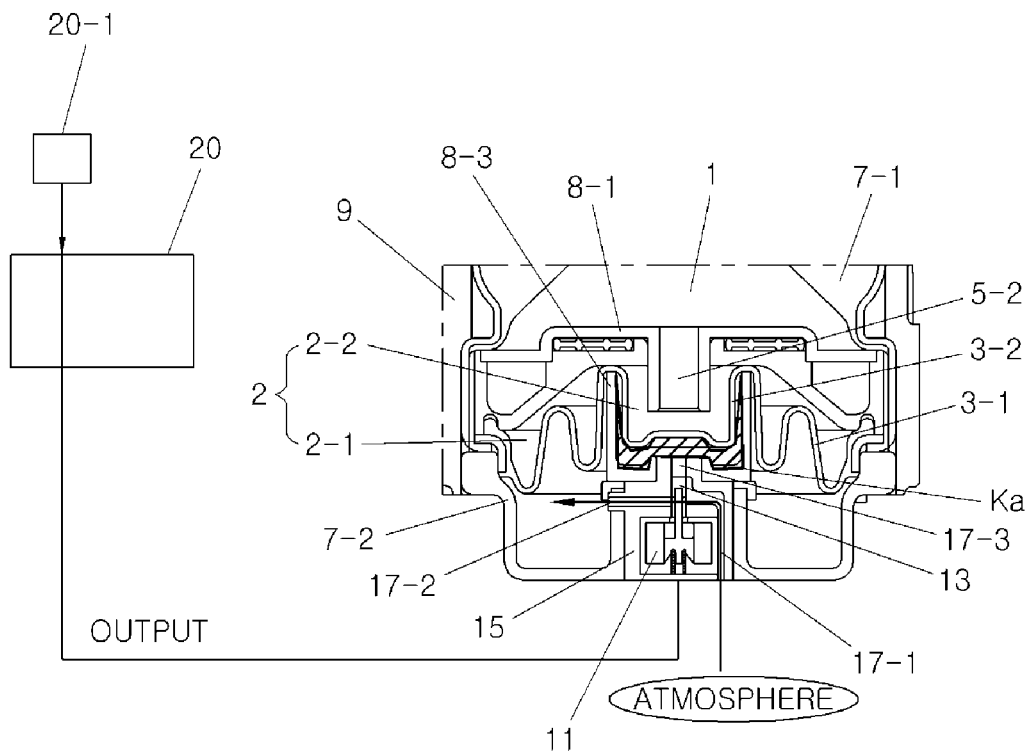
FIG. 6A and FIG. 6B are diagrams illustrating an operation state of the exemplary electronic indirect by-pass type semi-active mount according to the present invention in a vehicle driving condition.
Figure 6B:
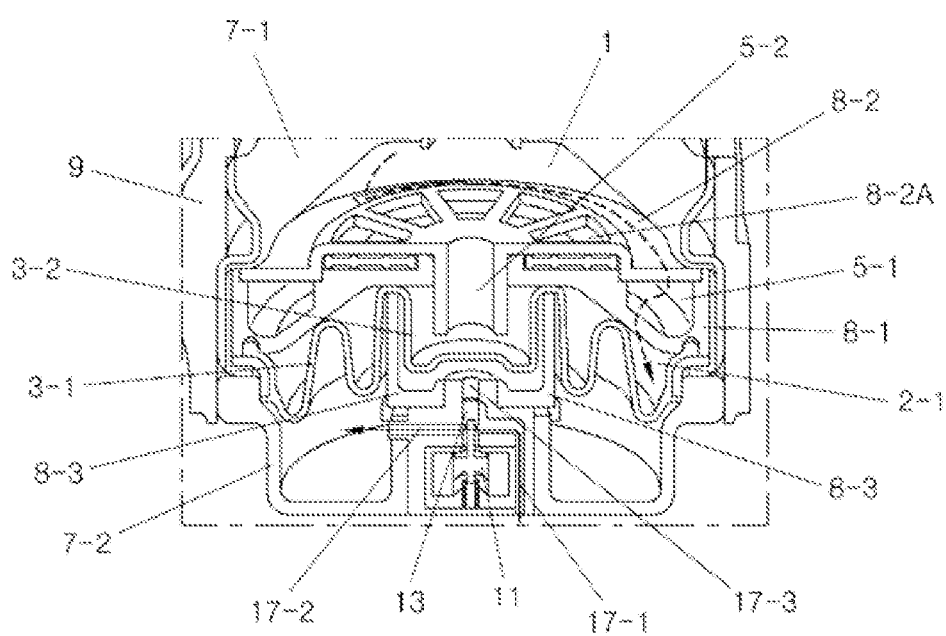

The control of EIBP_SAC 1A according to the vehicle driving condition is exemplified through FIG. 6A and FIG. 6B. As shown in the drawing, the valve controller 20 maintains current supply of the solenoid valve 11 so that the gate 13 allows the atmospheric pressure channel 17-1 and the primary diaphragm channel 17-2 to communicate with each other whereas it allows the secondary diaphragm channel 17-3 to be maintained in a blocked state. Consequently, since the inner space of the lower core 7-2 divided by the primary diaphragm 3-1 is under atmospheric pressure, an air layer outside the secondary diaphragm 3-2 on which the atmospheric pressure does not act forms an isolation state Ka from the atmosphere unlike the primary diaphragm 3-1 on which the atmospheric pressure acts so that the secondary diaphragm 3-2 is maintained as it is in a fixed state. Thereby, the secondary nozzle 5-2 communicating with the secondary diaphragm 3-2 is closed so as not to form the flow of fluid through the secondary lower fluid chamber 2-2.

Figure 7:
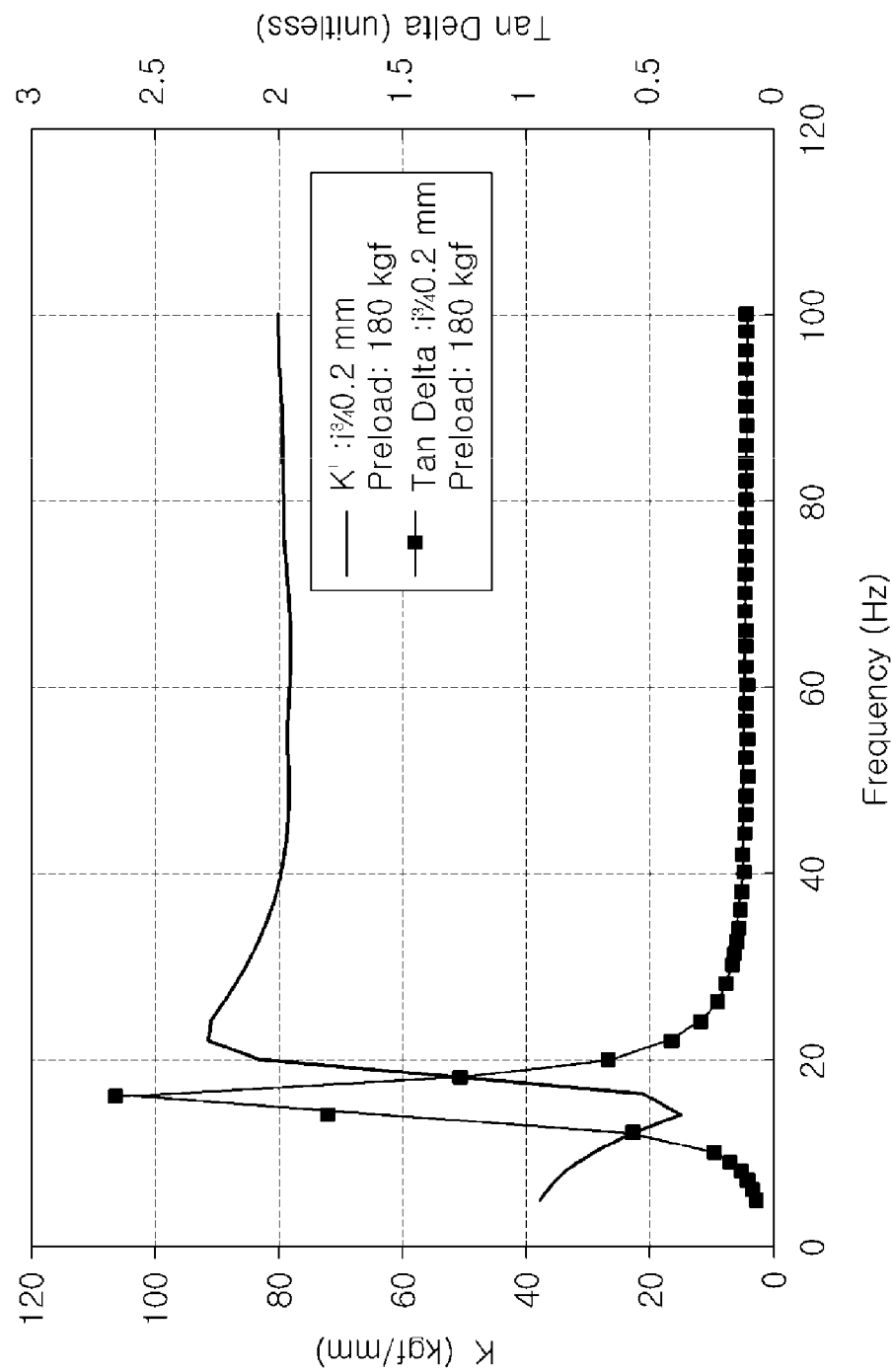
FIG. 7 is a graph illustrating performance according to FIG. 6A and FIG. 6B.

As a result, a circulation flow, in which a fluid in the upper fluid chamber 1 flows to the primary nozzle 5-1 through the orifice holes 8-2A of the second nozzle bracket 8-2 and the fluid flowing to the primary nozzle 5-1 flows to the primary lower fluid chamber 2-1, is formed. FIG. 7 illustratively shows a graph of a dynamic characteristic change rate exhibiting under the driving condition by the control of the EIBP_SAC 1A. Consequently, it may be identified that the EIBP_SAC 1A has good high frequency dynamic characteristics in the low frequency range (20~40 Hz).

Referring to FIG. 5A and FIG. 5B again, when it is determined that the vehicle driving condition is not established at S30, the valve controller 20 determines a need to adjust a dynamic characteristic change rate and the process enters S50. Then, an idle condition is determined at S50. As a result, when it is determined that the idle condition is not established, the process is returned to S20.

On the other hand, when it is determined that the idle condition is established at S50, an atmospheric introduction path is changed for blocking of a primary lower fluid chamber passage such as at S60 and the solenoid valve is turned from ON to OFF such as S61.

Figure 8A:
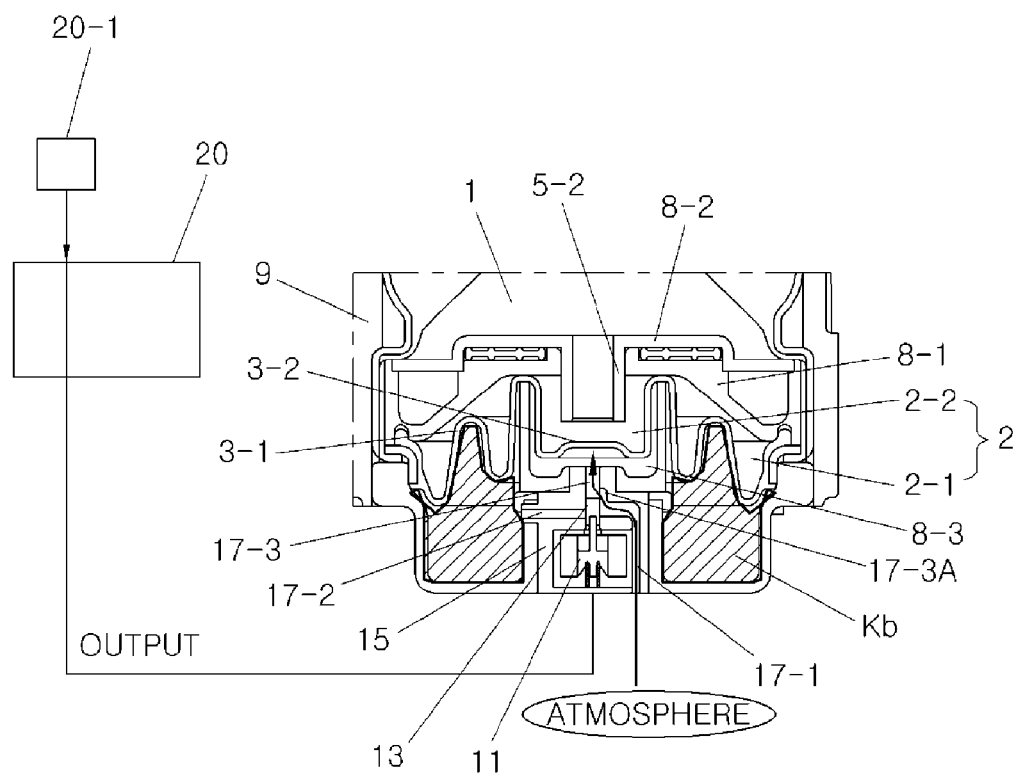
FIG. 8A and FIG. 8B are diagrams illustrating an operation state of the exemplary electronic indirect by-pass type semi-active mount according to the present invention in a vehicle idle condition.
Figure 8B:
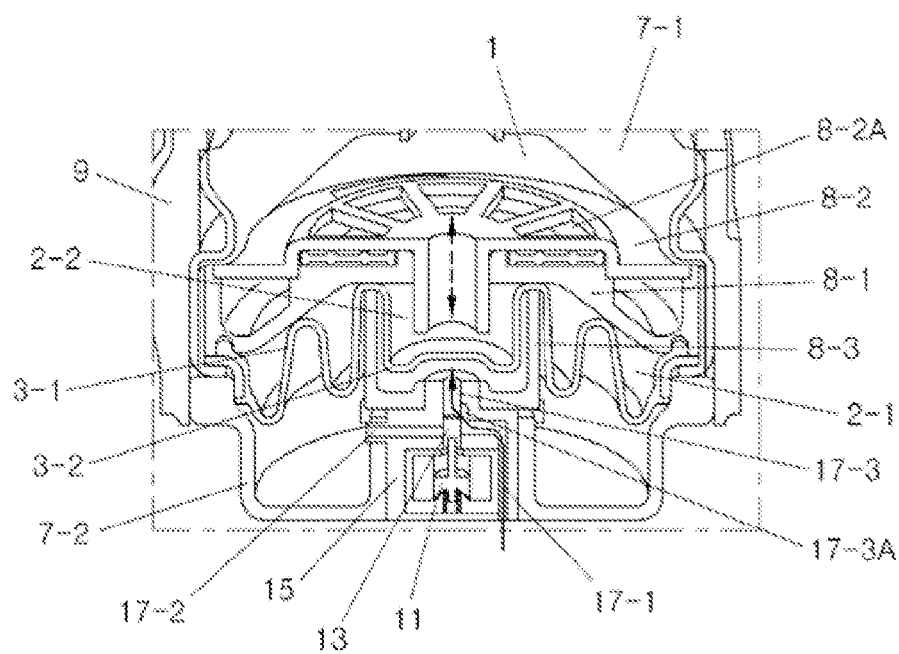
Figure 9:
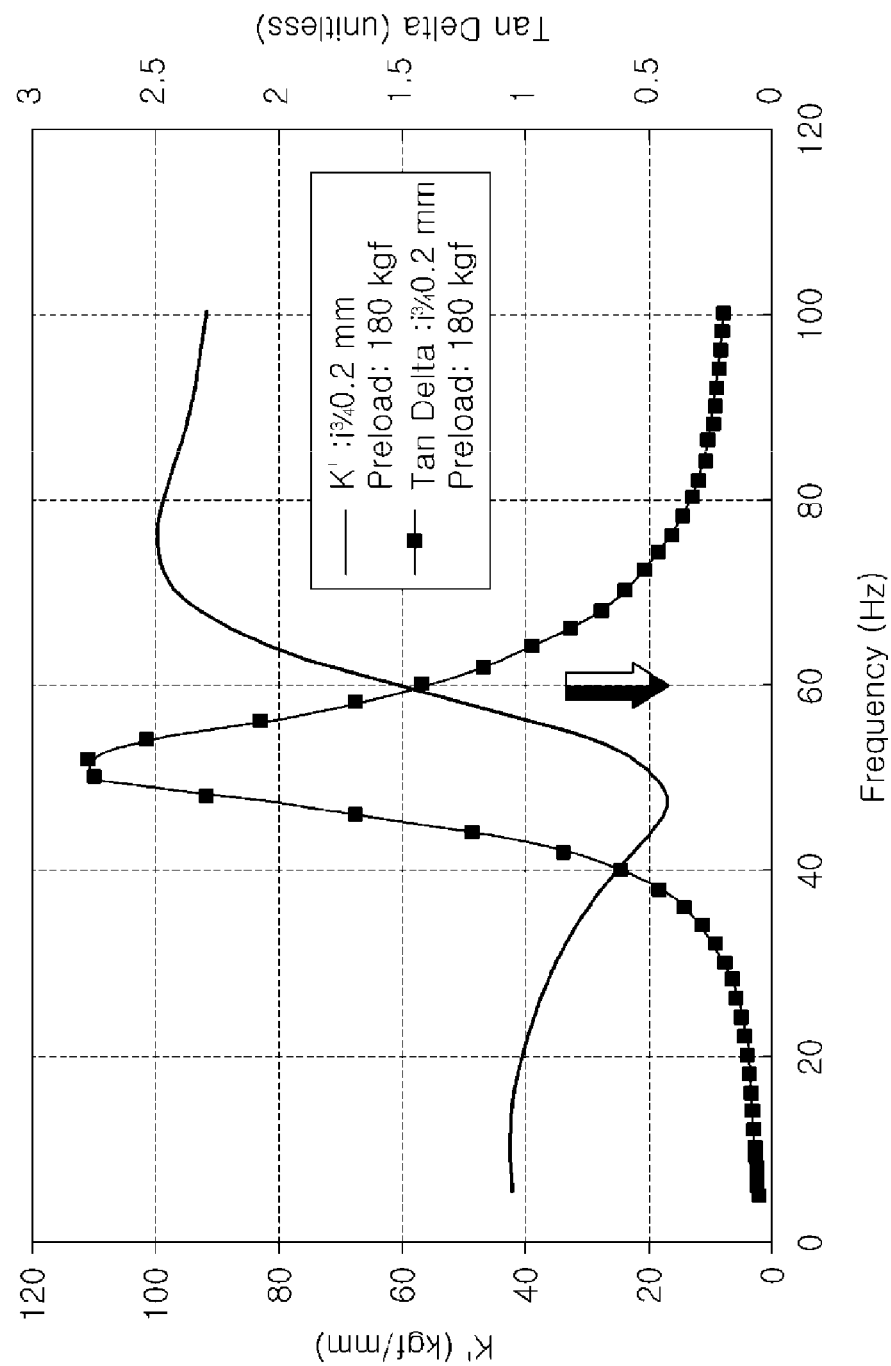
FIG. 9 is a graph illustrating performance according to FIG. 8A and FIG. 8B.

The control of EIBP_SAC 1A according to the idle condition is exemplified through FIG. 8A and FIG. 8B. As shown in the drawing, the valve controller 20 blocks current supply of the solenoid valve 11 so that the gate 13 allows the atmospheric pressure channel 17-1, the side expansion channel, and the primary diaphragm channel 17-2 to communicate with each other whereas it allows the primary diaphragm channel 17-2 to be changed in a blocked state. Consequently, since the inner space of the secondary diaphragm bracket 8-3 and the inner space defined beneath the secondary diaphragm 3-2 are under atmospheric pressure, an air layer outside the primary diaphragm 3-1 on which the atmospheric pressure does not act forms an isolation state Kb from the atmosphere unlike the secondary diaphragm 3-2 on which the atmospheric pressure acts so that the primary diaphragm 3-1 is changed to a fixed state. Thereby, the primary nozzle 5-1 communicating with the primary diaphragm 3-1 is closed so as not to form the flow of fluid through the primary lower fluid chamber 2-1.

As a result, a circulation flow, in which a fluid in the upper fluid chamber 1 flows to the secondary nozzle 5-2 formed at the center of the second nozzle bracket 8-2 and the fluid flowing to the secondary nozzle 5-2 flows to the secondary lower fluid chamber 2-2, is formed. FIG. 7 illustratively shows a graph of a dynamic characteristic change rate exhibiting under the idle condition by the control of the EIBP_SAC 1A. Consequently, it may be identified that the EIBP_SAC 1A has good high frequency dynamic characteristics in the low frequency range (20~40 Hz).

As described above, the electronic semi-active mount apparatus for controlling the dynamic characteristic variable rate according to various embodiments includes the EIBP_SAC 1A configured of the upper fluid chamber 1 receiving a fluid to which an exciting force as external force is transferred as a pressure, the lower fluid chamber 2 in which the fluid in the upper fluid chamber 1 is circulated, the primary diaphragm 3-1 dividing the lower fluid chamber 2 into the primary lower fluid chamber 2-1 in which the fluid in the upper fluid chamber 1 is circulated, the secondary diaphragm 3-2 dividing the lower fluid chamber 2 into the secondary lower fluid chamber 2-2 in which the fluid in the upper fluid chamber 1 is circulated, the primary nozzle 5-1 allowing the fluid in the upper fluid chamber 1 to be circulated in the primary lower fluid chamber 2-1, the secondary nozzle 5-2 allowing the fluid in the upper fluid chamber 1 to be circulated in the secondary lower fluid chamber 2-2, and the by-pass channels 17-1, 17-2, 17-3, and 17-3A which reverse the fixed states of the primary and secondary diaphragms 3-1 and 3-2 by the atmospheric pressure defined when the solenoid valve 11 is turned ON/OFF so as to block the flow of fluid in the primary lower fluid chamber 2-1 or the secondary lower fluid chamber 2-2. Thus, it may be possible to prevent the flow of fluid making a dynamic characteristic change rate low under the idle condition.

As is apparent from the above description, since the present invention changes directions of two passages in an indirection by-pass manner by a solenoid valve, it may be possible to prevent a dynamic characteristic change rate from decreasing due to undesired opening of the passages. Consequently, it may be possible to realize an electronic indirect by-pass type SAC which is configured of an electronic SAC and has improved performance.

In accordance with the present invention, since the directions of the two passages are changed by one solenoid valve, it may be possible to realize the electronic indirect by-pass type SAC without changing a structure of an existing electronic SAC for maximization of performance.

In accordance with the present invention, since the electronic indirect by-pass type SAC is configured of the electronic SAC and is realized in the indirect by-pass manner such as in a vacuum negative pressure type SAC through atmospheric introduction by the solenoid valve, the electronic indirect by-pass type SAC has an advantage of the vacuum negative pressure type SAC which is very advantageous to maximize idle performance of an engine. Particularly, since the electronic indirect by-pass type SAC is not provided with a vacuum hose, a valve applied to the engine, and the like which are necessary to the vacuum negative pressure type SAC, it may be possible to increase applicability by system simplification.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic indirect by-pass type semi-active mount comprising:
   a primary diaphragm dividing a lower fluid chamber, where a fluid in an upper fluid chamber to which an exciting force as external force is applied is circulated, into a primary lower fluid chamber where the fluid is circulated;
   a secondary diaphragm dividing the lower fluid chamber into a secondary lower fluid chamber where the fluid is circulated;
   a secondary diaphragm bracket blocking an atmospheric pressure formation peripheral space in which atmospheric pressure acts beneath the primary diaphragm and forming an atmospheric pressure formation central space in which atmospheric pressure acts beneath the secondary diaphragm; and
   by-pass channels in which a solenoid valve supplied with a current allows the atmospheric pressure formation peripheral space to communicate with an atmosphere whereas the solenoid valve blocks the atmospheric pressure formation central space from the atmosphere, and the solenoid valve which is not supplied with the current blocks the atmospheric pressure formation peripheral space from the atmosphere whereas the solenoid valve allows the atmospheric pressure formation central space to communicate with the atmosphere.

2. The electronic indirect by-pass type semi-active mount of claim 1, wherein the by-pass channels include:
   an atmospheric pressure channel opened to the atmosphere;
   a primary diaphragm channel connected to the atmospheric pressure channel to be opened to the atmospheric pressure formation peripheral space and a secondary diaphragm channel branched from the primary diaphragm channel to be opened to the atmospheric pressure formation central space; and
   a gate located at a branch part of the primary diaphragm channel and the secondary diaphragm channel is moved in a reversed direction by the solenoid valve such that the atmospheric pressure formation peripheral space or the atmospheric pressure formation central space is under atmospheric pressure.

3. The electronic indirect by-pass type semi-active mount of claim 2, wherein the atmospheric pressure channel is perpendicular to the primary diaphragm channel, and the primary diaphragm channel is perpendicular to the secondary diaphragm channel.

4. The electronic indirect by-pass type semi-active mount of claim 2, wherein the secondary diaphragm channel is further formed with a side expansion channel in a direction in which the atmosphere is introduced through the atmospheric pressure channel, and the side expansion channel has a length equal to an upward stroke of the gate.

5. The electronic indirect by-pass type semi-active mount of claim 2, wherein the atmospheric pressure formation peripheral space is under the atmospheric pressure when the gate is moved upward, whereas the atmospheric pressure formation central space is under the atmospheric pressure when the gate is moved downward.

6. The electronic indirect by-pass type semi-active mount of claim 1, wherein the primary diaphragm is formed integrally with the secondary diaphragm.

7. The electronic indirect by-pass type semi-active mount of claim 1, wherein an upper core to which the exciting force as the external force is applied is coupled above the upper fluid chamber, a lower core fixing a passage block formed with the by-pass channels is coupled beneath the lower fluid chamber, and a bottom of the secondary diaphragm bracket is supported by the passage block.

8. The electronic indirect by-pass type semi-active mount of claim 7, wherein the upper fluid chamber is distinguished from the lower fluid chamber by a first nozzle bracket forming a primary nozzle communicating with the primary lower fluid chamber and a second nozzle bracket forming a secondary nozzle fitted into a central hole of the first nozzle bracket.

9. The electronic indirect by-pass type semi-active mount of claim 8, wherein the first nozzle bracket has a dished cross-section, the secondary diaphragm is located on a flat bottom surface of the first nozzle bracket to form the secondary lower fluid chamber, and the primary diaphragm is fitted into a groove formed at a recessed circumference of the first nozzle bracket.

10. The electronic indirect by-pass type semi-active mount of claim 8, wherein the second nozzle bracket has a hollow boss protruding from a center thereof to form the secondary nozzle, and a plurality of orifice holes through which a fluid passes are radially formed around the hollow boss.

11. The electronic indirect by-pass type semi-active mount of claim 7, wherein the upper and lower cores are coupled by a mounting housing having a plurality of mounting fastening holes.

* * * * *